United States Patent
Kotani et al.

(10) Patent No.: US 6,316,093 B1
(45) Date of Patent: *Nov. 13, 2001

(54) RESIN COMPOSITION, LAMINATE, AND LAMINATE FILM

(75) Inventors: Kozo Kotani, Toyonaka; Toshio Kawakita, Funabashi; Taiichi Sakaya; Toshiya Kuroda, both of Takatsuki, all of (JP)

(73) Assignee: Sumitomo Chemical Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/939,951

(22) Filed: Sep. 29, 1997

Related U.S. Application Data (6362) Continuation of application No. 08/525,620, filed as application No.PCT/JP95/00072 on Jan. 24, 1995, now abandoned.

(30) Foreign Application Priority Data

Jan. 24, 1994 (JP) .................................................. 6-006013
Jan. 25, 1994 (JP) .................................................. 6-006470

(51) Int. Cl.$^7$ ...................................................... B32B 5/16
(52) U.S. Cl. .................... 428/323; 428/35.7; 428/324; 428/325; 428/328; 428/331; 428/910
(58) Field of Search .................. 428/35.7, 323, 428/325, 324, 328, 331, 910

(56) References Cited

U.S. PATENT DOCUMENTS

| | | | |
|---|---|---|---|
| 3,950,283 | * 4/1976 | Sellars et al. | 260/17 R |
| 3,976,618 | * 8/1976 | Takida et al. | 264/328 X |
| 3,994,845 | * 11/1976 | Blackford | 428/306 |
| 4,173,480 | * 11/1979 | Woodward | 428/404 |
| 4,425,410 | * 1/1984 | Farrell et al. | 428/516 |
| 4,472,538 | * 9/1984 | Kamigaito et al. | 524/445 X |
| 4,495,245 | * 1/1985 | Zunker | 524/446 X |
| 4,528,235 | * 7/1985 | Sacks et al. | 428/220 |
| 4,590,131 | * 5/1986 | Yazaki et al. | 428/516 |
| 4,600,744 | * 7/1986 | Libor et al. | 524/446 |
| 4,682,192 | * 7/1987 | Nomura et al. | 427/152 |
| 4,818,782 | * 4/1989 | Bissot | 524/413 |
| 4,889,885 | * 12/1989 | Usuki et al. | 524/445 |
| 4,927,689 | * 5/1990 | Markiewicz | 428/34.8 |
| 4,960,639 | * 10/1990 | Oda et al. | 428/34.5 |
| 4,983,432 | 1/1991 | Bissot | 428/35.7 |
| 4,999,229 | * 3/1991 | Moritani et al. | 428/36.6 |
| 5,110,855 | * 5/1992 | Blatz | 524/441 |
| 5,149,513 | * 9/1992 | Takahama et al. | 423/328 |
| 5,244,729 | 9/1993 | Harrison | 428/331 |
| 5,246,544 | * 9/1993 | Hollenberg et al. | 162/111 |
| 5,364,823 | * 11/1994 | Takahama et al. | 502/62 |
| 5,428,094 | * 6/1995 | Tokoh et al. | 524/379 |
| 5,492,953 | * 2/1996 | Itamura et al. | 524/449 X |
| 5,514,734 | * 5/1996 | Maxfield et al. | 523/304 |
| 5,631,755 | * 5/1997 | Sakaya et al. | 428/323 |
| 5,700,560 | * 12/1997 | Kotani et al. | 428/325 |
| 5,747,560 | * 5/1998 | Christiani et al. | 523/209 |
| 5,766,751 | * 6/1998 | Kotani et al. | 428/323 |

FOREIGN PATENT DOCUMENTS

| | | |
|---|---|---|
| 1-043554 | 2/1989 | (JP) . |
| A-62-148532 | 7/1989 | (JP) . |
| A-01-313356 | 12/1989 | (JP) . |
| 3-030944 | 2/1991 | (JP) . |
| A-3-93542 | 4/1991 | (JP) . |
| 4323244 | 11/1992 | (JP) . |
| A-05-39392 | 2/1993 | (JP) . |
| 0128734 * | 8/1982 | (JP) .................... 524/446 |

OTHER PUBLICATIONS

*Chemical Abstracts*, 123 (No. 6) Abstract No. 58164) (JP–A–07–041685 (Aug. 7, 1995).

\* cited by examiner

*Primary Examiner*—Judy M. Reddick
(74) *Attorney, Agent, or Firm*—Fitch, Even, Tabin & Flannery

(57) ABSTRACT

A resin composition comprising: a polyvinyl alcohol; and an inorganic laminar compound having an aspect ratio of not less than 50 and not more than 5000, which has a volume ratio of (inorganic laminar compound/polyvinyl alcohol) in the range of (5/95) to (30/70); and a laminate or laminate film comprising, as at least a portion thereof, a layer or portion (1) comprising such a resin composition. The resin composition, laminate or laminate film may exhibit a good gas barrier property while substantially retaining a good film strength.

11 Claims, 11 Drawing Sheets

Fig. 1

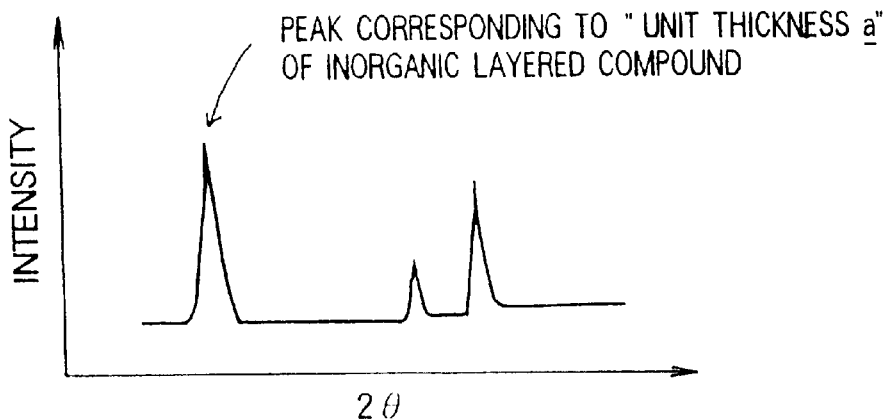

PEAK CORRESPONDING TO "UNIT THICKNESS $\underline{a}$" OF INORGANIC LAYERED COMPOUND

INTENSITY $2\theta$

Fig. 2

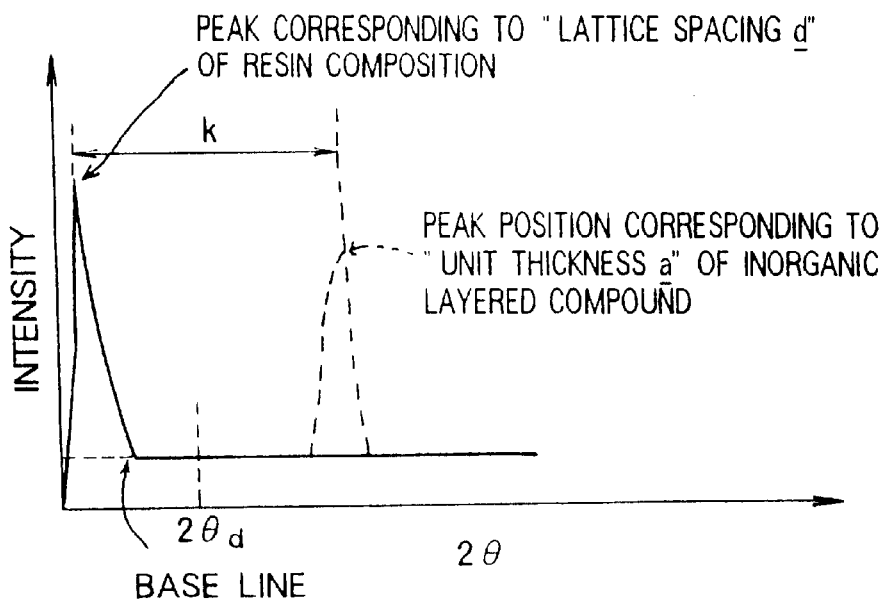

PEAK CORRESPONDING TO "LATTICE SPACING $\underline{d}$" OF RESIN COMPOSITION k

PEAK POSITION CORRESPONDING TO "UNIT THICKNESS $\underline{a}$" OF INORGANIC LAYERED COMPOUND

INTENSITY $2\theta_d$

BASE LINE $2\theta$ k (IN TERMS OF LENGTH) IS NOT SMALLER THAN WIDTH OF ONE RESIN CHAIN $\theta_d \rightarrow$ ANGLE OF DIFFRACTION CORRESPONDING TO "UNIT THICKNESS $\underline{a}$ + WIDTH OF ONE RESIN CHAIN"

Fig. 9

TABLE 1

| | BASE MATERIAL LAYER (THICKNESS μm) | INORGANIC LAYERED COMPOUND-CONTAINING LAYER [INORGANIC SUBSTANCE/RESIN VOLUME RATIO] (THICKNESS μm) |
|---|---|---|
| EX. 1 | OPP (20) | F/H[5.3/94.7] (0.8) |
| EX. 2 | OPP (20) | F/H[11/89] (0.8) |
| EX. 3 | OPP (20) | F/H[14/86] (0.8) |
| EX. 4 | OPP (20) | F/H[16.5/83.5] (0.8) |
| EX. 5 | OPP (20) | F/H[20/80] (0.8) |
| EX. 6 | OPP (20) | F/H[25/75] (0.8) |
| EX. 7 | OPP (20) | NA/H[25/75] (0.8) |
| EX. 8 | OPET (25) | F/H[16.5/83.5] (0.8) Z |
| EX. 9 | OPET (25) | F/H[20/80] (0.8) ZA |
| COMP. EX. 1 | OPP (20) | L/117[50/50] (0.8) |
| COMP. EX. 2 | OPP (20) | L/117[20/80] (0.8) |
| COMP. EX. 3 | OPP (20) | F/H[50/50] (0.8) |
| COMP. EX. 4 | OPP (20) | H[0/100] (0.8) |
| COMP. EX. 5 | OPET (25) | NA/H[50/50] (0.8) ZA |
| COMP. EX. 6 | OPP (20) | NONE |

Fig. 10

TABLE 2

| | OXYGEN PERMEABILITY (30 C, 60%RH) cc/m² · d · atm | FOLDING TEST | FILM STRENGTH TEST |
|---|---|---|---|
| EX. 1 | 0.3 | 0.3 | ○ |
| EX. 2 | 0.2 | 0.2 | ○ |
| EX. 3 | < 0.1 | 0.3 | ○ |
| EX. 4 | < 0.1 | 0.5 | ○ |
| EX. 5 | < 0.1 | 0.8 | ○ |
| EX. 6 | < 0.1 | 1.0 | ○ |
| EX. 7 | < 0.1 | 1.0 | ○ |
| EX. 8 | < 0.1 | ---- | ○ |
| EX. 9 | < 0.1 | ---- | ○ |
| COMP.EX.1 | 2.9 | 4.4 | × |
| COMP.EX.2 | 3.2 | 3.8 | ○ |
| COMP.EX.3 | < 0.1 | 2.2 | × |
| COMP.EX.4 | 3.5 | 3.5 | ○ |
| COMP.EX.5 | < 0.1 | ---- | × |
| COMP.EX.6 | ≥ 1000 | ---- | ---- |

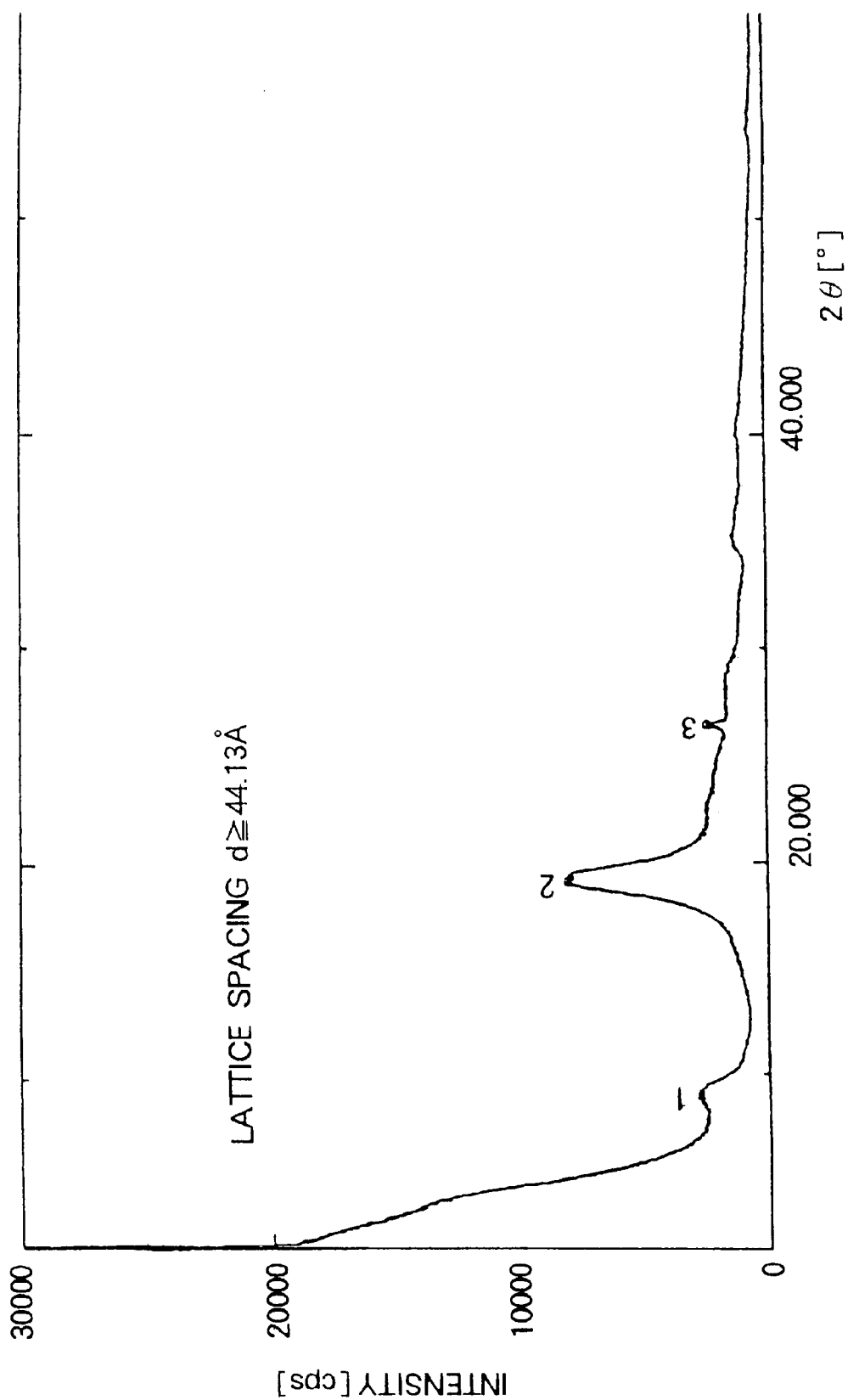

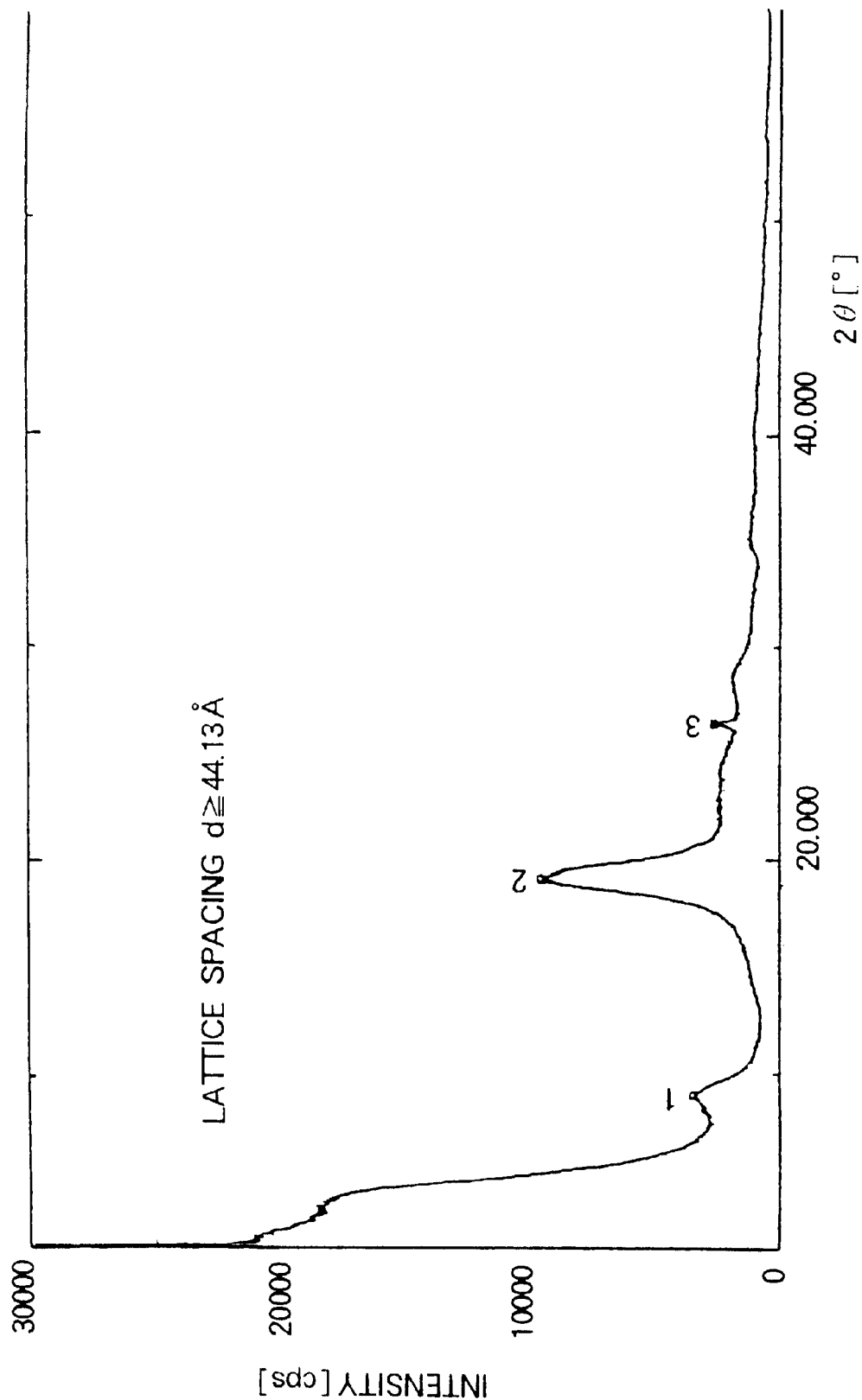

RESIN COMPOSITION, LAMINATE, AND LAMINATE FILM

This is a continuation of application Ser. No. 08/525,620, filed on Sep. 22, 1995 now abandoned, which is a 371 of international application PCT/JP95/00072, filed Jan. 24, 1995.

TECHNICAL FIELD

The present invention relates to a resin composition having an excellent gas barrier property, a laminate or laminate film which comprises at least one layer (or at least a portion) comprising such a resin composition, and a shaped (or molded) article comprising a portion of the resin composition.

BACKGROUND ART

A film having a gas barrier property (gas barrier film) as a kind of functional film has widely been put to practical use in the fields of food, medicine, agricultural chemicals, cosmetics, etc., wherein contents to be contained therein are stored or protected while the "quality" of the contents is liable to cause a problem. One of such important uses of the film includes a field of "packaging".

Packaging, i.e., making or putting an object into a package or wrap, or the material for the packaging is desired to have a wide variety of functions. For example, such functions of packaging may include: mechanical protective property, safety, sanitary property, workability, adaptability to goods (transparency, printability, heat sealing property), utility, profitability, etc. Among these functions, a "gas barrier property" to various gases, as one of the factors in the above-mentioned storability or protective property, is an important property for affecting the storability of the above contents such as food. Along with recent diversification in the form of goods distribution or in packaging technique, intensification of additive control, change in taste, etc., the importance of the gas barrier property has been increased more and more. On the other hand, the gas barrier property has heretofore been a serious weak point of ordinary plastic materials.

Factors which can deteriorate a food include oxygen, light, heat and/or moisture. Among these factors, oxygen has been considered to be a substance causing such deterioration. A material having a gas barrier property (gas barrier material) is a material which has a main function of effectively intercepting oxygen. Such a gas barrier material exhibits the function of intercepting oxygen, and simultaneously exhibits a function which is essential for various measures for controlling the deterioration of food (such as gas charging and vacuum packaging). The gas barrier material has been utilized very effectively in many fields such as food packaging inclusive of confectionery bags, bags for dried bonito, pouches for retorted foods, containers for carbonated drinks, etc., or packaging for cosmetics, agricultural chemicals, and medical use, on the basis of its barrier function to various kinds of gases such as oxygen, organic solvent vapors, aromas; or on the basis of its function of preventing corrosion, odor, sublimation, etc., based on the barrier function thereof.

Among films comprising a thermoplastic resin, those films comprising oriented polypropylene, polyester, polyamide, etc., particularly have excellent mechanical property, heat resistance, transparency, etc., and therefore these films are widely used as a packaging material. However, in a case where a film comprising such a material is used for food packaging, since the barrier property thereof to a gas such as oxygen is insufficient, the food as the contents in the package is liable to be deteriorated due to degradation based on oxidation, or the function of aerobic bacteria, etc. Furthermore, in such a case, an aroma component of the food permeates the package to be diffused to the outside of the package. As a result, there tend to occur various problems such that the flavor of the food is lost, or the contents are wetted with outside moisture due to the penetration of such moisture and the taste thereof becomes worse. Accordingly, when a film of the above-mentioned material such as polypropylene is used for food packaging, it is usual to adopt a method wherein another film (or layer) having an excellent gas barrier property is laminated onto the film of the above-mentioned material.

As a transparent plastic raw material having a small gas permeability (i.e., a large gas barrier property), there have heretofore been known some films comprising a raw material such as polyvinyl alcohol, polyethylene-vinyl alcohol copolymer, and polyvinylidene chloride-type resin. However, these plastic materials have an oxygen permeability to a certain degree which is never negligible, while a metal or glass raw material to be used for canned foods or bottled foods only has a substantially no oxygen permeability.

As a method of imparting a gas barrier property or increasing the gas barrier property of a resin, there has been known some methods. For example, Japanese Laid-Open Patent Application (KOKAI) No. 30944/1991 (i.e., Hei 3-30944) describes a process for producing a coated film wherein a coating composition comprising polyvinyl alcohol and synthetic hectorite in a wt. ratio of 20:80 is applied onto a biaxially oriented polyethylene terephthalate (OPET), and then dried.

However, such films provided by the above-mentioned conventional techniques still do not have a sufficient gas barrier property, and is not a satisfactory film having a gas barrier property suitable for practical use.

An object of the present invention is to provide a resin composition, a laminate, or a laminate film which has solved the above-mentioned problems.

A more specific object of the present invention is to provide a resin composition, a laminate, or a laminate film having a gas barrier property at a good level.

SUMMARY AND OBJECTS OF THE INVENTION

As a result of earnest study, the present inventors have found that a resin composition having an excellent gas barrier property has been provided by constituting a resin composition while an inorganic laminar compound having a specific aspect ratio is combined with a polyvinyl alcohol as a specific resin in a specific volume ratio. As a result of further study, the present inventors have also found that the excellent gas barrier property of such a resin composition is substantially retained, even when a laminate or laminate film is constituted while at least a layer (or portion) comprising the above-mentioned resin composition is disposed on a base material, etc.

The laminate according to the present invention is based on the above discovery and comprises: a polyvinyl alcohol; and an inorganic laminar compound having an aspect ratio of not less than 50 and not more than 5000, which has a volume ratio of (inorganic laminar compound/polyvinyl alcohol) in the range of (5/95) to (30/70).

The present invention also provides a laminate comprising: a base material, and at least one layer disposed thereon comprising a resin composition; which comprises a polyvinyl alcohol, and an inorganic laminar compound having an aspect ratio of not less than 50 and not more than 5000; and has a volume ratio of (inorganic laminar compound/polyvinyl alcohol) in the range of (5/95) to (30/70).

The present invention further provides a shaped article comprising, at least a portion thereof, a resin composition; which comprises a polyvinyl alcohol, and an inorganic laminar compound having an aspect ratio of not less than 50 and not more than 5000; and has a volume ratio of (inorganic laminar compound/polyvinyl alcohol) in the range of (5/95) to (30/70).

BRIEF DESCRIPTION OF DRAWINGS

FIG. 1 is a graph schematically showing a relationship between an X-ray diffraction peak of an inorganic laminar compound and a "unit thickness a" of the compound.

FIG. 2 is a graph schematically showing a relationship between an X-ray diffraction peak of a resin composition containing an inorganic laminar compound and a "lattice spacing (or distance between lattice planes) d" of the composition.

FIG. 9 (Table 1) is a table showing the structure of laminate films obtained in Examples appearing hereinafter.

FIG. 10 (Table 2) is a table showing the data of oxygen permeability, etc., obtained in the above Examples.

FIG. 15 is a graph showing X-ray diffraction peaks of a composition having a lattice spacing d≧44.13 angstrom (pattern of the above FIG. 3).

FIG. 16 is a graph showing X-ray diffraction peaks of a composition having a lattice spacing d≧44.13 angstrom (pattern of the above FIG. 3).

BEST MODE FOR CARRYING OUT THE INVENTION

Figure 3:
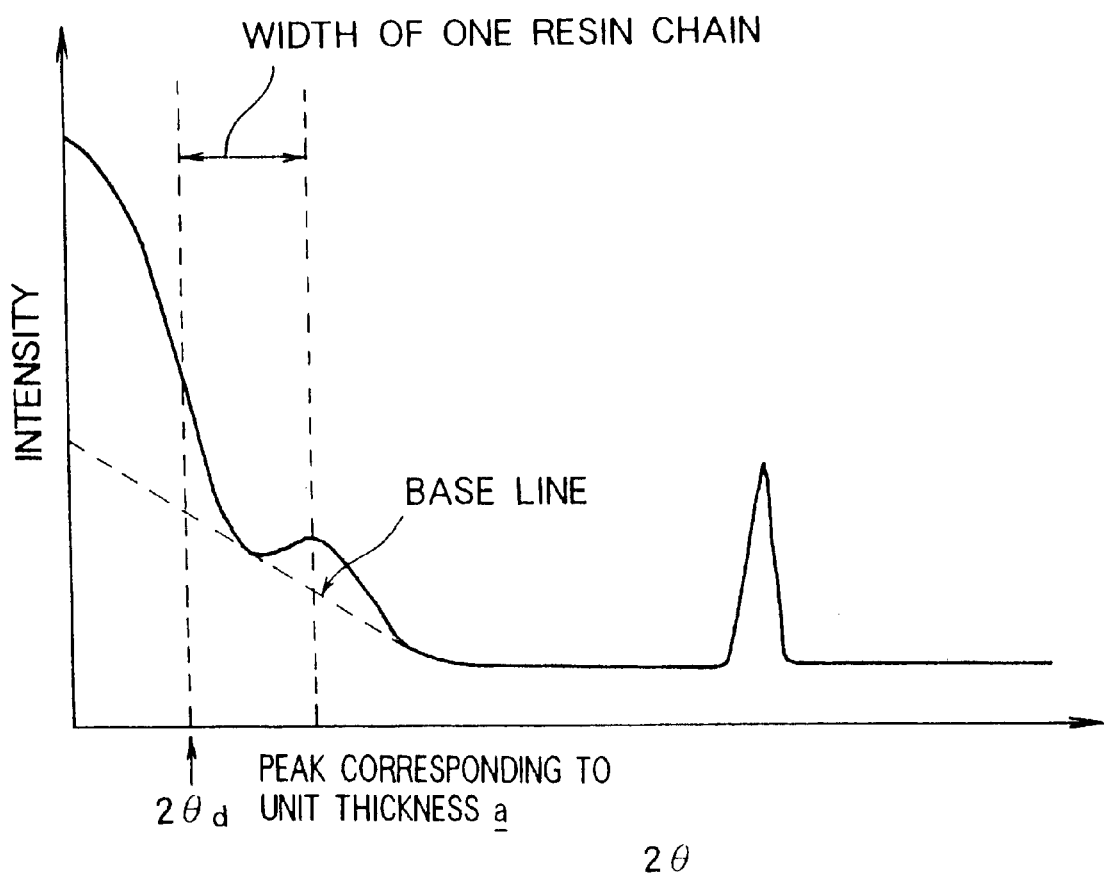
FIG. 3 is a graph schematically showing a relationship between an X-ray diffraction peak of a resin composition and a "lattice spacing d" of the composition, in a case where the peak corresponding to the lattice spacing d is superposed on halo (or background) and is difficult to be detected. In this Figure, the area obtained by subtracting a "base line" portion from the peak area in the lower angle side below $2 \cdot \theta_d$ is treated as the peak corresponding to the "lattice spacing d".

Hereinbelow, the present invention will be described in detail with reference to the accompanying drawings, as desired.

Polyvinyl Alcohol

In the present invention, the "polyvinyl alcohol" refers to a polymer predominantly comprising a monomer unit of vinyl alcohol. Specific examples of such a "polyvinyl alcohol" may include: a polymer (exactly, a copolymer of vinyl alcohol and vinyl acetate) obtained by subjecting the acetic acid portion of a vinyl acetate polymer to hydrolysis or ester interchange (saponification), and polymers obtained by saponifying a polymer such as vinyl trifluoroacetate polymer, vinyl formate polymer, vinyl pivalate polymer, t-butyl vinyl ether polymer, and trimethylsilyl vinyl ether polymer. With respect to the details of the "polyvinyl alcohol", a book entitled "PVA no Sekai (World of PVA)" edited by POVAL-KAI (POVAL Society), (1992), published by KOBUNSI KANKO-KAI (Polymer Publishing Society) K.K.; and a book entitled "Poval" written by Nagano et al. (1981), published by KOBUNSI KANKO-KAI may be referred to.

The degree of the "saponification" in the polyvinyl alcohol may preferably be not less than 70% (more preferably, not less than 85%), particularly preferably not less than 98% (i.e., so-called "completely saponified product"), in terms of mole percentage. The degree of polymerization of the polyvinyl alcohol may preferably be not less than 100 and not more than 5000 (more preferably, not less than 200 and not more than 3000).

Inorganic Laminar Compound

The "inorganic laminar compound" to be used in the present invention refers to an inorganic compound wherein unit crystal layers are mutually stacked to form a layer structure. In other words, "laminar compound" refers to a compound or substance having a layer structure. The "layer structure" is a structure wherein planes, each of which comprises atoms strongly bonded to each other on the basis of covalent bonds, etc., so as to form close packing, are stacked substantially parallel to each other on the basis of weak bonding power such as Van der Waals force.

The "inorganic laminar compound" usable in the present invention is not particularly limited, as long as the "aspect ratio" thereof measured by a method described hereinafter is not less than 50 and not more than 5000. In view of the gas barrier property, the aspect ratio may preferably be not less than 100 (particularly, not less than 200).

When the above aspect ratio is less than 50, the exhibition of the gas barrier property becomes insufficient. On the other hand, it is technically difficult to obtain an inorganic laminar compound having an aspect ratio exceeding 5000, and further such a compound is costly or expensive from an economic viewpoint. In view of easiness in production of an inorganic laminar compound, the aspect ratio may preferably be not more than 2000 (more preferably, not more than 1500). In view of the balance between the gas barrier property and the easiness in production, the aspect ratio may preferably be in the range of 200–3000.

In view of the film forming property or formability in the form of a film or shaped article, the "particle size" measured by a method therefor described hereinafter may preferably be not more than 5 μm. When the particle size exceeds 5 μm, the film forming property or formability of a resin composition tends to be decreased. In view of the transparency of a resin composition, the particle size may more preferably be not more than 3 μm. In a case where the resin composition according to the present invention is used for a purpose (e.g., purpose of food packaging) wherein the transparency is important, the particle size may particularly preferably be not more than 1 μm.

Specific examples of the inorganic laminar compound may include: graphite, phosphoric acid salt-type derivative compounds (such as zirconium phosphate-type compound), chalcogen-type compounds, clay-type minerals, etc. The "chalcogen-type compound" used herein refers to a di-chalcogen type compound which comprises an element of Group IV (Ti, Zr, Hf), Group V (V, Nb, Ta), and/or Group VI (Mo, W), and represented by a formula of $MX_2$, wherein M denotes an element as described above, and X denotes a chalcogen (S, Se, Te).

In view of easiness in the provision of a large aspect ratio, it is preferred to use an inorganic laminar compound having a property such that it is swollen or cleft in a solvent.

The degree of the "swelling or cleavage" of the inorganic laminar compound to be used in the present invention in a solvent may be evaluated by the following "swelling or cleavage" test. The inorganic laminar compound may preferably have a swelling property of not less than about 5 (more preferably, not less than about 20) according to the following swelling test. On the other hand, the inorganic laminar compound may preferably have a cleavage property of not less than about 5 (more preferably, not less than about 20) according to the following cleavage test. In these cases, a solvent having a density smaller than the density of the inorganic laminar compound is used. When the inorganic laminar compound is a natural clay mineral having a swelling property, it is preferred to use water as the above solvent.

<Swelling Property Test>

2 g of an inorganic laminar compound is slowly added to 100 mL of a solvent, while 100 mL-graduated cylinder is used as a container. The resultant mixture is left standing, and thereafter the volume of the former (the dispersion layer of the inorganic laminar compound) is read from the graduation corresponding to the interface between the dispersion layer of the inorganic laminar compound and the supernatant after 24 hours at 23° C. When the resultant value is larger, the swelling property is higher.

<Cleavage Property Test>

30 g of an inorganic laminar compound is slowly added to 1500 mL of a solvent, and is dispersed by means of a dispersion machine (DESPER MH-L, mfd. by Asada Tekko K.K., vane diameter=52 mm, rotating speed=3100 rpm, container capacity=3 L, distance between the bottom face and the vane=28 mm) for 90 minutes at a peripheral speed of 8.5 m/sec (23° C.). Thereafter, 100 mL of the resultant dispersion liquid is taken out and placed into a graduated cylinder, and then is left standing for 60 minutes. Then, the volume of the dispersion layer of the inorganic laminar compound is read from the graduation corresponding to the interface between the dispersion layer of the inorganic laminar compound and the supernatant.

As the inorganic laminar compound capable of being swollen or cleft in a solvent, it is particularly preferred to use a clay mineral having a swelling or cleaving property. The clay minerals may be classified into two types, i.e., one type having a two-layer structure, which comprises a silica tetrahedral layer, and an octahedral layer disposed thereon and comprising a central metal such as aluminum and magnesium; and another type having a three-layer structure, which comprises an octahedral layer comprising a central metal such as aluminum and magnesium, and a silica tetrahedral layer disposed on both sides of the octahedral layer so as to sandwich the octahedral layer.

Specific examples of the former two-layer type may include: kaolinite series, antigorite series, etc. Specific examples of the latter three-layer type may include: smectite series, vermiculite series, mica series, etc., depending on an interlayer cation contained therein.

More specific examples of the clay mineral may include: kaolinite, dickite, nacrite, halloysite, antigorite, chrysotile, pyrophyllite, montmorillonite, hectorite, tetrasilylic mica, sodium taeniolite, muscovite, mercallite or margarosanite, talc, vermiculite, phlogopite, xanthophyllite, chlorite, etc.

Particle Size

In view of difficulty, etc., in the measurement of the (true) particle size in a resin composition, in the present invention, a value (L) which may be determined in a solvent by a dynamic light scattering method F5 (photon correlation spectroscopy) as described hereinafter is used as the "particle size" of the inorganic laminar compound. The "dynamic light scattering method" used herein is a particle size-measuring method utilizing a scattering phenomenon of laser light, wherein scattering light from particles conducting Brownian movement, i.e., scattering light with fluctuation depending on the moving velocity or particle size (grain size) of these particles, is detected, and an information on the particle size is obtained by calculation.

According to the present inventors' knowledge, the particle size of the inorganic laminar compound contained in a resin may be approximated by the above-mentioned "particle size in a solvent" obtained by the dynamic light scattering method. For example, in a case where an inorganic laminar compound which has sufficiently been swollen with a solvent (which is the same kind of the solvent used in the dynamic light scattering method) is combined with a resin, the particle size of the inorganic laminar compound contained in the resin may sufficiently be approximated by the "particle size in a solvent" obtained by the dynamic light scattering method.

Aspect Ratio

In the present invention, the aspect ratio (Z) of the inorganic laminar compound is a ratio which may be determined on the basis of a relationship of $Z=L/a$.

In this relationship, L is the particle size of an inorganic laminar compound determined by the dynamic light scattering method in a solvent, and a is the "unit thickness" of the inorganic laminar compound. The "unit thickness a" is a value which is determined on the basis of the measurement of the inorganic laminar compound alone, by a powder X-ray diffraction method, etc., as described hereinafter. More specifically, as schematically shown in the graph of FIG. 1 wherein the abscissa denotes 2·θ, and the ordinate denotes the intensity of X-ray diffraction peaks, the "unit thickness a" is a spacing obtained from the Bragg's equation ($n \cdot \lambda = 2 \cdot D \cdot \sin \theta$, n=1, 2, 3 ... ), wherein θ denotes the angle corresponding to the peak having the lowermost angle among those of the observed diffraction peaks. With respect to the details of the powder X-ray diffraction method, a book entitled "Kiki-Bunseki no Tebiki (Handbook on Instrumental Analysis) (a)", page 69, (1985), editorially supervised by Jiro SHIOKAWA, published by KAGAKU DOJIN K.K. may be referred to.

In correspondence to the above relationship of Z=L/a based on the measurement of the inorganic laminar compound alone, when the resin composition according to the present invention is subjected to the powder X-ray diffraction method, the lattice spacing d of the inorganic laminar compound contained in the resin composition may usually be obtained.

More specifically, as schematically shown in the graph of FIG. 2 wherein the abscissa denotes 2·θ, and the ordinate denotes the intensity of X-ray diffraction peaks, the "lattice spacing d" (a<d) is a spacing corresponding to the peak having the lowermost angle among the observed diffraction peaks appearing on the lower angle (larger spacing) side as compared with the position of the diffraction peak corresponding to the above-mentioned "unit thickness a". In a case where the above peak corresponding to the "lattice spacing d" is superposed on a halo (or background) as schematically shown in the graph of FIG. 3 so that it is difficult to detect such a peak, the area of a portion obtained by subtracting the base line portion from a portion corresponding to an angle lower than $2 \cdot \theta_d$, is treated as a peak corresponding to the "lattice spacing d". The $\theta_d$ used herein is an angle of diffraction corresponding to "(unit length a)+(width of one resin chain)". With respect to the details of a method of determining the "lattice spacing d", a book entitled "Nendo no Jiten (Encyclopedia of Clay)", page 35 et seq. and page 271 et seq., (1985), edited by Shuici IWAO et al., published by ASAKURA SHOTEN K.K. may be referred to.

The integrated intensity of the diffraction peak (corresponding to the "lattice spacing d") observed in the powder X-ray diffraction of a resin composition may preferably have a relative ratio of not less than 2 (more preferably, not less than 10), with respect to the integrated intensity of the diffraction peak as a standard (corresponding to the "lattice spacing a").

In general, the difference between the above lattice spacing d and the "unit thickness a", namely, the value of k=(d−a)(when converted into "length") may be equal to, or larger than the width of one resin chain constituting the resin composition (k=(d−a)≧(width of one resin chain)). The "width of one resin chain" may be determined by simulation calculation, etc. (as described in, e.g., a book entitled "KOBUNSHI KAGAKU JORON (Introduction to Polymer Chemistry)", pages 103–110 (1981), published by KAGAKU DOJIN K.K.). In the case of polyvinyl alcohol, this width is 4–5 Å (angstrom), and in the case of water molecules, this width is 2–3 Å.

It is considered that the above-mentioned aspect ratio Z=L/a is not always equal to "true aspect ratio" of the inorganic laminar compound in the resin composition. However, it is reasonable to approximate the "true aspect ratio" by the aspect ratio Z, for the following reason.

Thus, it is extremely difficult to directly measure the "true aspect ratio" of the inorganic laminar compound contained in a resin composition. On the other hand, in a case where there is a relationship of a<d between the lattice spacing d determined by the powder X-ray diffraction method for the resin composition, and the "unit thickness a" determined by the powder X-ray diffraction method for the inorganic laminar compound alone; and the value of (d−a) is not smaller than the width of one resin chain in the resin composition, it is assumed that the resin is inserted between layers of the inorganic laminar compound. Accordingly, it is sufficiently reasonable to approximate the thickness of the inorganic laminar compound in the resin composition by the abovementioned "unit thickness a", i.e., to approximate the "true aspect ratio" in the resin composition by the abovementioned "aspect ratio Z" of the inorganic laminar compound alone.

As described above, it is extremely difficult to measure the true particle size in the resin composition. However, it may be considered that the particle size of the inorganic laminar compound in the resin is quite near to the particle size in a solvent, when the inorganic laminar compound, which has fully been swollen with a solvent of the same kind as that of the solvent used in the dynamic light scattering method, is combined with a resin to provide a resin composition.

However, it is hardly considered that the particle size L determined by the dynamic light scattering method exceeds the major axis length $L_{max}$ of the inorganic laminar compound, and therefore the possibility that true aspect ratio ($L_{max}/a$) is smaller than the "aspect ratio Z" used in the present invention (i.e., the possibility of $L_{max}/a<Z$), is theoretically very small.

In consideration of the above-mentioned two viewpoints, it is considered that the definition of the aspect ratio Z used in the present invention is sufficiently reasonable. Thus, in the present specification, the "aspect ratio" or "particle size" means the "aspect ratio Z" as defined above, or "particle size L" determined by the dynamic light scattering method.

Solvent

In the present invention, the solvent for swelling the inorganic laminar compound is not particularly limited, as long as it is usable in the production of the resin composition. For example, when a natural clay mineral having a swelling property is used as an inorganic laminar compound, specific examples of the solvent may include: water, alcohols such as methanol;

polar solvent such as dimethylformamide, dimethyl sulfoxide, and acetone; or mixtures comprising two or more species selected from these solvents. It is preferred to use water or an alcohol such as methanol having a relatively low boiling point, in view of easiness in the removal thereof after the film formation or shaping of the resin composition.

Crosslinking Agent for Hydrogen-bonding Group

In the present invention, a crosslinking agent for a hydrogen-bonding group (such as hydroxyl group) may be used as desired, for the purpose of improving the water resistance (or barrier property after water-resistance environmental test) of a highly hydrogen-bonding resin such as polyvinyl alcohol.

The crosslinking agent for the hydrogen-bonding group usable in the present invention is not particularly limited. Preferred examples of the crosslinking agent may include: titanium-type coupling agent, silane-type coupling agent, melamine-type coupling agent, epoxy-type coupling agent, isocyanate-type coupling agent, copper compound, zirconia compound, etc. in view of the water resistance, a zirconia compound may particularly preferably be used.

Specific examples of the zirconia compound may include: halogenated zirconium such as zirconium oxychloride, hydroxy zirconium chloride, zirconium tetrachloride, and zirconium bromide; zirconium salts of mineral acid such as zirconium sulfate, basic zirconium sulfate, and zirconium nitrate; zirconium salts of organic acid such as zirconium formate, zirconium acetate, zirconium propionate, zirconium caprylate, and zirconium stearate; zirconium complex salts such as zirconium ammonium carbonate, zirconium sodium sulfate, zirconium ammonium acetate, zirconium sodium oxalate, zirconium sodium citrate, zirconium ammonium citrate; etc.

The amount of the addition of the crosslinking agent for a hydrogen-bonding group is not particularly limited, but the crosslinking agent may preferably be used so as to provide a ratio (K=CN/HN), i.e., ratio of the mole (CN) of the crosslinking-providing group of the crosslinking agent, to the mole (HN) of the hydrogen-bonding group of the highly hydrogen-bonding resin (such as polyvinyl alcohol), which is not less than 0.001 and not more than 10. The above molar ratio K may more preferably be in the range of not less than 0.01 and not more than 1.

Transparency

A film or shaped article comprising the resin composition according to the present invention may preferably have a transparency, in view of advantage in a case where it is used for a purpose such as packaging. The transparency may preferably have a degree of not less than 80% (more preferably, not less than %) in terms of transmittance of whole light at a wavelength of 500 nm. For example, such a transparency may preferably be measured by means of a commercially available spectrophotometer (Automatic Recording Spectrophotometer Model-330, mfd. by Hitachi Seisakusho K.K.).

Oxygen Permeability

The resin composition, laminate, or laminate film according to the present invention has a gas barrier property. The gas barrier property may preferably be not more than 0.5 cc/m$^2$·day·atm, more preferably, not more than 0.2 cc/m$^2$·day·atm (particularly preferably, not more than 0.15 cc/m$^2$·day·atm), in terms of an oxygen permeability under the conditions of 30° C. and 60% RH (relative humidity).

Resistance to Folding

The resin composition, laminate or laminate film according to the present invention may preferably have a folding (or bending) resistance. The folding resistance may preferably be 100 or less, more preferably 20 or less (particularly preferably, 10 or less), in terms of an increment ratio R in the oxygen permeability defined by R=$P_F/P_I$ (wherein $P_F$ denotes the oxygen permeability after a folding test, and $P_I$ denotes the oxygen permeability before the folding test), when the resin composition, laminate, or laminate film according to the present invention is subjected to a "folding test" as described hereinafter. At the time of the folding test, the resin composition is subjected to the folding test, after a layer comprising the resin composition and having a thickness after drying of 0.8 μm is formed on a 20 μm-thick "OPP Film" as described hereinafter so that the entirety thereof is formed into a laminated film-type shape.

Resin Composition

With respect to the composition ratio (volume ratio) between the inorganic laminar compound and the polyvinyl alcohol used in the present invention, the volume ratio of inorganic laminar compound/polyvinyl alcohol (ratio at the time of "Shikomi" (mixing for preparation)) is in the range of 5/95 to 30/70. When the volume ratio (volume fraction) of the above inorganic laminar compound/polyvinyl alcohol is below 5/95, the gas barrier property becomes insufficient, and particularly, the decrease in the barrier property due to folding becomes marked. On the other hand, when the above volume ratio exceeds 30/70, the resultant flexibility or formability of the film becomes insufficient, whereby peeling from a base material is liable to occur in the case of a laminate film.

In view of the suppression of a decrease in the barrier property due to folding, the volume ratio may preferably be not less than 7/93. On the other hand, in view of the flexibility or the suppression of peeling property from the base material, the volume ratio may preferably be not more than 17/83. In other words, a volume ratio in the range of 7/93 to 17/83 is particularly preferred, because the decrease in the barrier property due to the folding may substantially be obviated, and a high barrier property may easily be obtained in such a range.

Such a volume ratio may be determined by dividing respectively the numerator value (weight of the inorganic laminar compound) and the denominator value (weight of resin) constituting the weight ratio at the time of the "mixing for preparation" of these components, by respective densities. In general, there can be a case wherein the density of a resin (e.g., polyvinyl alcohol) is somewhat different depending on the crystallinity thereof. In the above case, however, it is possible to calculate the volume ratio while assuming the crystallinity of the polyvinyl alcohol to be 50%.

Production Method

The method of formulating or producing the above composition comprising an inorganic laminar compound and a polyvinyl alcohol is not particularly limited. In view of the homogeneity or easiness in handling at the time of the formulation, it is possible to adopt, e.g., a method (first method) wherein a solution obtained by dissolving a polyvinyl alcohol, and a dispersion obtained by preliminarily swelling or cleaving an inorganic laminar compound, are mixed with each other, and thereafter the solvent is removed; a method (second method) wherein a dispersion obtained by swelling or cleaving an inorganic laminar compound, is added to a polyvinyl alcohol, and thereafter the solvent is removed; a method (third method) wherein an inorganic laminar compound is added to a solution obtained by dissolving a polyvinyl alcohol to obtain a dispersion in which the inorganic laminar compound is swollen or cleft, and thereafter the solvent is removed; a method (fourth method) wherein an inorganic laminar compound and a polyvinyl alcohol are kneaded under heating; etc. In view of easiness in the provision of a large aspect ratio of the inorganic laminar compound, it is preferred to adopt the former three method (first to third methods).

In the former two methods (first to second methods), in view of improvement in the water resistance (barrier property after the water-resistance environmental test), it is preferred that the solvent is removed from the system and thereafter a thermal aging treatment is conducted at a temperature of not less than 110° C. and not more than 220° C. (more preferably, a temperature of not less than 130° C. and not more than 210° C.). The aging period of time is not particularly limited. In consideration of the necessity for a film temperature to reach at least a set temperature, for example, it is preferred to adopt an aging time of not less than 1 sec. and not more than 10 min. (more preferably, about 3 sec. to 1 min.) in the case of a drying method using a heating medium-contact type dryer such as hot-air dryer, in view of a balance between the water resistance and productivity.

The heat source to be used in the above aging treatment is not particularly limited. For example, it is possible to apply any of various methods such as those utilizing heat roll contact, heat medium contact (air, oil, etc.), infrared heating, and microwave heating.

The effect of improving the water resistance may remarkably be enhanced in a case where the inorganic laminar compound is a clay mineral having a swelling property.

Laminate Structure

The laminate structure or shaped structure of a resin composition according to the present invention is not particularly limited, as long as it comprise, as at least a portion (or layer) thereof, a polyvinyl alcohol composition comprising a polyvinyl alcohol and an inorganic laminar compound having an aspect ratio of not less than 50 and not more than 5000. More specifically, the resin composition according to the present invention may be shaped into any of various forms such as film, sheet, and container.

Figure 4:
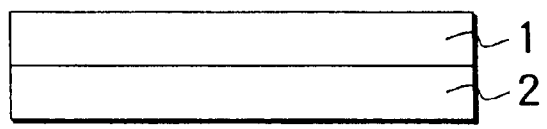
FIG. 4 is a schematic sectional view showing an embodiment of the laminate film according to the present invention, which comprises a base material, and a layer disposed thereon comprising a resin composition according to the present invention.

FIG. 4 is a schematic sectional view showing an embodiment wherein the resin composition according to the present invention is shaped into the form of a laminate film. Referring to FIG. 4, the laminate film in this embodiment comprises a first base material layer 2, and a layer 1 of a resin composition disposed thereon comprising an inorganic laminar compound and a polyvinyl alcohol.

Figure 5:
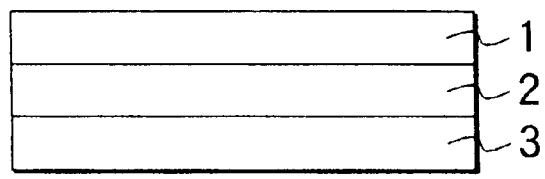
FIG. 5 is a schematic sectional view showing another embodiment of the laminate film according to the present invention, which comprises a base material, and a layer disposed thereon comprising a resin composition according to the present invention.
Figure 6:
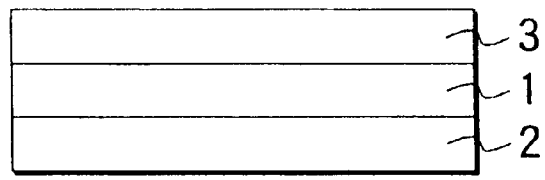
FIG. 6 is a schematic sectional view showing a further embodiment of the laminate film according to the present invention, which comprises a base material, and a layer disposed thereon comprising a resin composition according to the present invention.
Figure 7:
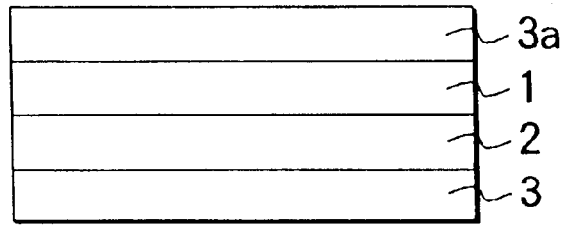
FIG. 7 is a schematic sectional view showing a further embodiment of the laminate film according to the present invention, which comprises a base material, and a layer disposed thereon comprising a resin composition according to the present invention.

The laminate film according to the present invention may also have a laminate structure as shown in the schematic sectional views of FIGS. 5–7. The laminate film in the embodiment of FIG. 5 comprises a second base material layer 3, a first base material layer 2 disposed on the second base material layer 3, and a layer 1 of a resin composition disposed on the first base material layer 2 and comprising an inorganic laminar compound and a polyvinyl alcohol. The laminate film in the embodiment of FIG. 6 comprises a first base material layer 2, a layer 1 of a resin composition disposed on the first base material layer 2 and comprising an inorganic laminar compound and a polyvinyl alcohol, and a second base material layer 3 disposed on the resin composition layer 1. In addition, the laminate film in the embodiment of FIG. 7 comprises a second base material layer 3, a first base material layer 2 disposed on the second base material layer 3, a layer 1 of a resin composition disposed on the first base material layer 2 and comprising an inorganic laminar compound and a polyvinyl alcohol, and a second base material layer 3a disposed on the resin composition layer 1.

Base Material

In the present invention, the base material to be used for the base material (or substrate) layer (e.g., the base material layer 2 in the embodiment of FIG. 4) is not particularly limited. It is possible to use any of known or ordinary base materials such as resin, paper, aluminum foil, woody material, cloth, and nonwoven fabric, in accordance with the use or purpose thereof.

Specific examples of the polyvinyl alcohol constituting the base material may include: polyolefin-type resins such as polyethylene (low density, high density) ethylene-propylene copolymer, ethylene-butene copolymer, ethylene-hexene copolymer, ethylene-octene copolymer, polypropylene, ethylene-vinyl acetate copolymer, ethylene-methyl methacrylate copolymer, and ionomer resin; polyester-type resins such as polyethylene terephthalate (PET), polybutylene terephthalate, and polyethylene naphthalate; amide-type resins such as nylon-6, nylon-6·6, metaxylenediamine-adipic acid condensation polymer, and polymethyl methacrylimide; acrylic-type resins such as polymethyl methacrylate; styrene- or acrylonitrile-type resins such as polystyrene, styrene-acrylonitrile copolymer, styrene-acrylonitrile-butadiene copolymer, and polyacrylonitrile; hydrophobicity-imparted cellulose-type resins such as cellulose triacetate, and cellulose diacetate; halogen-containing resins such as polyvinyl chloride, polyvinylidene chloride, polyvinylidene fluoride, and polytetrafluoroethylene (Teflon); hydrogen-bonding resins such as polyvinyl alcohol, ethylene-vinyl alcohol copolymer and cellulose derivatives; engineering plastic-type resins such as polycarbonate polyvinyl alcohol, polysulfone resin, polyethersulfone resin, polyether ether ketone resin, polyphenylene oxide resin, polymethylene oxide resin, and liquid crystal resin; etc.

In the present invention, in view of the strength or gloss, the resin layer to be used for the above-mentioned base material layer may preferably be an oriented (particularly, biaxially oriented) film.

Specific examples of such an oriented film may include a biaxially oriented polypropylene film, a biaxially oriented polyamide film, a biaxially oriented polyethylene terephthalate film, etc.

Method of Forming Lamination, etc.

The method for laminating or forming a laminate or laminate film is not particularly limited. As a method for laminating a resin composition layer containing an inorganic laminar compound on a base material layer, it is preferred to use a coating method wherein a coating liquid containing a composition comprising a polyvinyl alcohol and an inorganic laminar compound is applied onto the surface of a base material, and then dried and heat-treated; a method wherein a layer of a resin composition containing an inorganic laminar compound is laminated afterward onto a base material layer; a method wherein a resin(for forming a base material layer) is extrusion-laminated onto a resin composition layer containing an inorganic laminar compound; etc. One or more interfaces between the respective layers constituting the laminate film according to the present invention may be subjected to a treatment such as corona treatment and anchor coating treatment, as desired.

Specific examples of the coating method may include: gravure methods such as direct gravure method, reverse gravure method and micro-gravure method; roll coating methods such as twin-roll bead coating method, and bottom-feed triple reverse coating method; doctor knife method, die coating method, tip coating method, bar coating method, and coating method combining these coating methods.

When the above-mentioned laminate is formed, it is preferred to use a method wherein an inorganic laminar compound, which is in a state such that it has been swollen or cleft in a solvent, is dispersed in a polyvinyl alcohol resin (or a solution of such a resin), and then the solvent is removed from the resultant mixture system while substantially retaining such a dispersion state.

The thickness of a layer comprising a resin composition comprising an inorganic laminar compound and a polyvinyl alcohol is not particularly limited. While the thickness of the resin composition layer is somewhat different depending on the kind of a base material to be combined therewith, or an intended barrier performance, etc., the thickness may preferably be not more than 10 μm in terms of the thickness after drying. In a case where a higher transparency is demanded, the thickness may preferably be not more than 2 μm (more preferably, not more than 1 μm) in terms of thickness after drying. When the thickness is not more than 1 μm, it is considerably advantageous in view of the transparency as the resultant laminate. Accordingly, such a thickness is particularly preferred for a use wherein transparency is particularly demanded (e.g., use for food packaging).

The thickness of the resin composition layer does not have a particular lower limit. In view of provision of a sufficient gas barrier property, the thickness may preferably be 1 nn or larger, more preferably 10 nm or larger (particularly preferably, 100 nm or larger).

In the present invention, it is possible to laminate another base material (such as the second base material 3 or 3a in the embodiments of FIGS. 5–6) onto the above-mentioned laminate film comprising a first base material and a resin composition layer. The base material to be used for such a purpose is not particularly limited, and may appropriately be selected in accordance with the use or purpose thereof. For example, it is possible to use any of known or ordinary base materials such as resin, paper, aluminum foil, woody material, cloth, and nonwoven fabric as described hereinabove.

In addition, it is also possible to mix with or add to the resin composition, film or shaped article according to the present invention as desired, any of various additives such as ultraviolet light absorbing agent, colorant, and antioxidant, within a range wherein the effect of the present invention is not substantially impaired. Further, it is of course possible to use an adhesive or printing ink, as desired, e.g., at the time of laminating operation.

Hereinbelow, the present invention will be described in detail with reference to Examples, by which the present invention is not limited.

EXAMPLES

The methods of measuring various physical properties used in the present specification are described below.

<Oxygen Permeability>

Oxygen permeability was measured by using a method according to Japanese Industrial Standard (JIS) (JIS K-7126).

More specifically, a sample film (test piece) was mounted to a commercially available oxygen permeability measuring apparatus (trade name: OX-TRAN 10/50A, mfd. by MOCON Co. U.S.A.), and the oxygen permeability was measured under the measuring conditions of a temperature of 31° C. (humidity-controlled thermostat=21° C.). At this time, the relative humidity was about 61%. In this measurement, the oxygen permeability of the sample film was continuously measured, and the oxygen permeability at a point of time at which the oxygen permeability became substantially constant (usually, about several hours to three days after the initiation of the measurement) was used as the data thereof in this specification. When the oxygen transmission is represented by the ordinate of a graph, and the time t is represented by the abscissa thereof, the period of time (θ sec.) wherein the film interior reaches the equilibrium may be represented by an equation of $\theta = d^2/6 \cdot D$, wherein d denotes the film thickness (μm) of the sample film, and D denotes a diffusion constant ((μm)$^2$/sec).

Accordingly, the period of time for the measurement is different depending on the kind of the sample.

<Folding Test>

A 33 cm-wide non-oriented polypropylene film (trade name: Pylene Film-CT, mfd. by Toyobo K.K., thickness 50 μm) was dry-laminated onto an inorganic laminar compound-containing layer (resin composition layer) side of a laminate film to be examined by means of a laminating machine (trade name: Test-Coater, mfd. by Yasui Seiki co.) under a pressure of 4 kg/cm$^2$ at a speed of 6 m/min., while using a urethane-type adhesive (trade name: Yunoflex-J3, mfd. by Sanyo Kasei K.K.) in an amount of 3 g/m$^2$ (solid content). The resultant dry-laminated film was then sampled to be formed into a test piece form having a length of 12 cm and a width of 12 cm.

Figure 8:
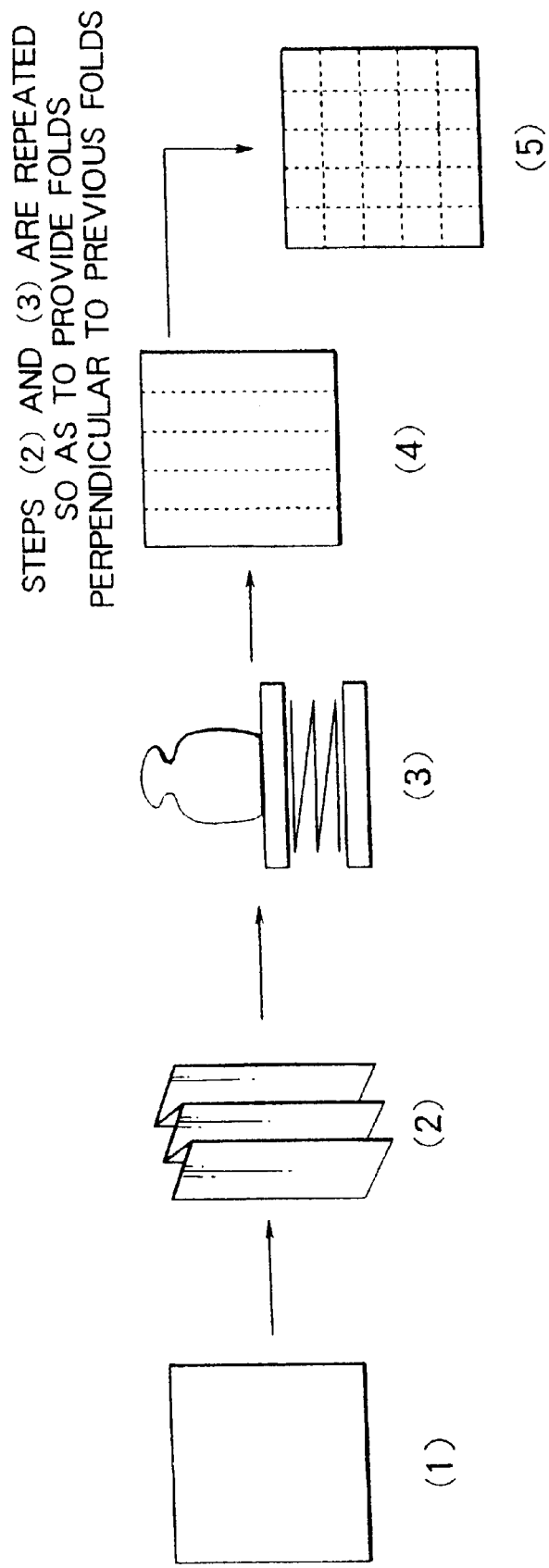
FIG. 8 is a schematic view for illustrating a folding method used in a "folding test" as described hereinafter.

The test piece was subjected to "folding" in the following manner. Thus, as shown in FIG. 8, the test piece (Step 1) was folded into an accordion-like shape having an interval of 1 cm by using hands (Step 2). The resultant test piece was then sandwiched between two flat plates of acrylic resin (dimensions: 15 cm×15 cm, thickness: about 5 mm). A load of 5 kg was applied to the resultant sandwich-like product, and the sandwich-like product was left standing for 3 min. in this state (Step 3). Then, the application of the load was removed and the test piece was once spread (Step 4). Thereafter, the spread test piece was again subjected to the above "folding" process (Steps 2 to 3) except that the test piece was provided with folds perpendicular to the "first folds" which had been provided to the test piece as described above, to be folded into an accordion-like shape having an interval of 1 cm, whereby a "test piece after folding" (Step 5) was obtained.

The thus prepared "test piece after folding" was subjected to oxygen permeability measurement in a manner as described hereinabove. When pin-holes, etc., are formed in the inorganic laminar compound-containing layer during the above "folding", the resultant oxygen permeability tends to be increased.

<Film Strength Test (qualitative test)>

A double-side coated adhesive tape was bonded to a test piece (length 5 cm×5 cm square) of a laminate film to be examined on the opposite surface side thereof, which is the side opposite to the inorganic laminar compound-containing layer (resin composition layer), and then the test piece was fixed onto a flat plate of acrylic resin. One cutting line having a dimension of 5 mm×5 mm square was imparted to the thus fixed test piece by use of a cutter knife. Then, a commercially available adhesive cellophane tape (trade name: Sekisui-Celotape, mfd. by Sekisui Kagaku Kogyo K.K., width: 18 mm) was bonded to the test piece in a length of about 3 cm so as to cover the above-mentioned "cutting line" under a load of 1 kg/cm for 10 min. Thereafter, the above acrylic resin plate and the adhesive cellophane tape were peeled from each other by hands so as to provide an angle of about 90 degrees therebetween, whereby the breakage or peeling of the inorganic laminar compound-containing layer was observed with naked eyes.

As a result of the above peeling test, a case wherein the breakage or peeling of the inorganic laminar compound-containing layer was observed was represented by a symbol "x" and a case wherein no breakage or peeling of the inorganic laminar compound-containing layer was observed was represented by a symbol "O".

<Thickness Measurement>

A thickness of not less than 0.5 μm was measured by means of a commercially available digital-type thickness measuring device (contact-type thickness measuring device, trade name: Ultra-High Precision Deci-Micro Head MH-15M, mfd. by Nihon Kogaku Co.).

On the other hand, a thickness of less than 0.5 μm was determined by a gravimetric analysis method, wherein the weight of a film having a predetermined area was measured, the resultant weight was divided by the area, and further divided by the specific gravity of the composition; or an elemental analysis method (in the case of a laminate comprising a resin composition layer and a base material, etc.).

In a case where the elemental analysis (measuring principle: ICP emission spectrometry, with reference to a book entitled "ICP Emission Spectrometry", edited by Nihon Bunseki Kagaku-kai (Japan Society of Analytical Chemistry), 1988, published by Kyoritsu Shuppan) was used, the ratio between the layer of the resin composition according to the present invention and the base material was determined by calculation on the basis of the ratio between the analytical value of a predetermined inorganic element (originating from the composition) of the laminate, and the fraction of a predetermined element (e.g., Si) of the inorganic laminar compound alone.

<Particle Size Measurement>

Predetermined parameters such as the refractive index of a solvent (e.g., n=1.332 in the case of water), the viscosity of the solvent (e.g., η=0.890 cp, in the case of water), and the refractive index of an inorganic laminar compound (e.g., n=1.56 in the case of mica) were inputted to a commercially available ultrafine particle size analyzing apparatus (trade name: BI-90, mfd. by Brookheaven Co., U.S.A., Japanese agent: Nikkiso K.K.), and measurement was conducted at a temperature of 25° C., in a solvent of water, while a solution having a weight ratio (inorganic laminar compound/water) of 2% was diluted in accordance with an estimated particle size. Through such a method, the particle size L was determined as a central particle size value measured by a photon correlation method based on dynamic light scattering, which was automatically outputted from the above analyzer as a digital value. In this particle size measurement for the inorganic laminar compound, each time the measurement was conducted, calibration measurement was also conducted by using the following standard samples comprising true spherical fine particles, whereby it was confirmed that the measured data of the particle size of the standard samples fell within the range of relative error of ±10%.

True Spherical Fine Particles: particles mfd. by Dow Chemical Co., U.S.A., trade name: UNIFORM LATEX PARTICLES <Particle Sizes Determined by SEM (scanning electron microscope); Dow>

0.085 μm (deviation 0.0055 μm)
0.109 μm (deviation 0.0027 μm)
0.330 μm (deviation 0.0040 μm)
0.806 μm (deviation 0.0057 μm)
2.02 μm (deviation 0.0135 μm)
2.97 μm (deviation 0.23 μm)

<Aspect Ratio Calculation>

An inorganic laminar compound and a resin composition were respectively subjected to diffraction measurement by means of a commercially available X-ray diffractometer (trade name: XD-5A, mfd. by Shimazu Seisakusho K.K.) through a powder method. The lattice spacing (unit thickness) a was determined on the basis of the measurement of the inorganic laminar compound alone. In addition, it was confirmed that a portion in which the lattice spacing of the inorganic laminar compound had been increased (a portion in which lattice spacing d>a) was present in the resin composition, on the basis of the diffraction measurement of the resin composition.

By use of the resultant particle size L obtained by the dynamic scattering method, the aspect ratio Z was determined by using an equation of Z=L/a.

Example 1

Natural montmorillonite (trade name: Kunipia F, mfd. by Kunimine Kogyo K.K.) was dispersed in ion exchange water (electric conductivity: 0.7 μS/cm or below) so as to provide a concentration of 1 wt. %, thereby to provide a dispersion of an inorganic laminar compound (Liquid A). The above montmorillonite had a particle size of 560 nm, a unit thickness a obtained by powder X-ray diffraction of 1.2156 nm, and an aspect ratio of 461.

Separately, a polyvinyl alcohol (trade name: PVA 117H, mfd. by Kuraray K.K., saponification degree=99.6%, degree of polymerization=1700) was dissolved in ion-exchange water (electric conductivity: 0.7 μS/cm or below) so as to provide a concentration of 1 wt. %, thereby to provide a resin solution (Liquid B).

The thus obtained Liquids A and B were mixed with each other so as to provide a solid content ratio (volume ratio) of (inorganic laminar compound/resin)=5.3/94.7, thereby to provide a coating liquid.

A 20 μm-thick biaxially oriented polypropylene film (trade name: Pylene Film OT, mfd. by Toyobo K.K.) was subjected to corona discharge treatment. Onto the thus treated film, the coating liquid having the above composition was applied by gravure coating (by use of "Test Coater" mfd. by Yasui Seiki K.K., microgravure coating method, coating speed: 3 m/min., drying temperature: 80° C. (inlet side heater), 100° C. (outlet side heater)), thereby to provide a laminate film. The thickness after drying of the above coating layer was 0.8 μm.

The thus obtained laminate film was subjected to an oxygen permeability test, a folding test, and a film strength test. The test results are shown in FIG. 10 (Table 2).

As shown in the above Table 2, the laminate film obtained by this example provided excellent results with respect to all of the items of the above oxygen permeability, folding resistance (suppression of a decrease in barrier property due to folding), and film strength.

Examples 2–7

Laminate films were prepared and were subjected to an oxygen permeability test, a folding test, and a film strength test in the same manner as in Example 1, except that the kind of the base material or inorganic laminar compound, and the volume ratio between the inorganic laminar compound and the polyvinyl alcohol were respectively changed to those shown in Table 1 (FIG. 9). The test results are shown in Table 2 (FIG. 10).

As shown in the above Table 2, the laminate films obtained by these examples provided excellent results with respect to all of the items of the above oxygen permeability, folding resistance (suppression of a decrease in barrier property due to folding), and film strength.

Example 8

Zirconium ammonium carbonate (trade name: Zircon AC7, mfd. by Dai-ichi Kigenso Kogyo K.K., an aqueous solution containing 15 wt. % of the solute (calculated in terms of zirconium oxide)), as a crosslinking agent for hydrogen-bonding group was added to the mixture solution comprising the Liquid A and Liquid B prepared in Example 1 in an amount so as to provide a ratio of the zirconium element of one mole, with respect to 15 mole of the hydroxyl group of the polyvinyl alcohol. By use of the resultant mixture, a laminate film was prepared and was subjected to an oxygen permeability test, and a film strength test in the same manner as in Example 1, except that a biaxially oriented polyethylene terephthalate film (trade name: Lumilar, mfd. by Toray K.K., thickness: 25 μm) was used as the base material, and the other constituents were changed to those as shown in Table 1 (FIG. 9). The respective measurement results are shown in the above Table 2 (FIG. 10).

As shown in the above Table 2, the laminate film obtained by this example provided excellent results with respect to all of the items of the above oxygen permeability, and film strength.

Example 9

Zirconium ammonium carbonate (trade name: Zircozol AC7, mfd. by Dai-ichi Kigenso Kogyo K.K., an aqueous solution containing 15 wt. % of the solute (calculated in terms of zirconium oxide)), as a crosslinking agent for hydrogen-bonding group was added to the mixture solution comprising Liquid A and Liquid B prepared in Example 1 in an amount so as to provide a ratio of the zirconium element of one mole with respect to 15 mole of the hydroxyl group the polyvinyl alcohol. By use of the resultant mixture, a laminate film was prepared in the same manner as in Example 1, except that the other constituents were changed to those as shown in Table 1 (FIG. 9). Thereafter, the resultant laminate film was subjected to a heat treatment by means of a hot-air dryer at 180° C. for 5 min., thereby to provide a laminate film.

The thus prepared laminate film was subjected to an oxygen permeability test and a film strength test. The respective measurement results are shown in the above Table 2 (FIG. 10). As shown in the above Table 2, the laminate film obtained by this example was excellent in both of the above oxygen permeability and film strength.

Comparative Examples 1–2

Laminate films were prepared and were subjected to an oxygen permeability test, a folding test, and a film strength test in the same manner as in Example 1, except that an inorganic laminar compound having a small aspect ratio (aspect ratio Z=about 35) was used and the other constituents were changed to those as shown in Table 1 (FIG. 9). The test results are shown in Table 2 (FIG. 10).

As shown in the above Table 2, the laminate films obtained by these Comparative Examples were considerably poor in the gas barrier property.

Comparative Example 3

A laminate films was prepared and was subjected to an oxygen permeability test, a folding test, and a film strength test in the same manner as in Example 1, except that the volume ratio between the inorganic laminar compound and the polyvinyl alcohol was changed to that as shown in Table 1 (FIG. 9). The test results are shown in Table 2 (FIG. 10).

As shown in the above Table 2, the laminate film obtained by this Comparative Example was considerably poor in the folding resistance, and was also weak in the film strength.

Comparative Example 4

A laminate films was prepared and was subjected to an oxygen permeability test, a folding test, and a film strength test in the same manner as in Example 1, except that the inorganic laminar compound was used without adding a polyvinyl alcohol thereto (i.e., volume ratio of the inorganic laminar compound=0) as shown in Table 1 (FIG. 9). The test results are shown in Table 2 (FIG. 10).

As shown in the above Table 2, the laminate film obtained by this Comparative Example was considerably poor in the gas barrier property.

Comparative Example 5

A laminate films was prepared and was subjected to an oxygen permeability test, a folding test, and a film strength test in the same manner as in Example 9, except that the kind of the inorganic laminar compound, the volume ratio between the inorganic laminar compound and the polyvinyl alcohol, and the crosslinking agent for hydrogen-bonding group were changed to those as shown in Table 1 (FIG. 9). The test results are shown in Table 2 (FIG. 10).

As shown in the above Table 2, the laminate film obtained by this Comparative Example was weak in the film strength.

Comparative Example 6

The oxygen permeability of a commercially available 20 μm-thick biaxially oriented polypropylene film (trade name: Pylene Film-OT, mfd. by Toyobo K.K.) was measured. As a result, it was found that the oxygen permeability was not less than 1000 cc/m$^2$·day·atm, and the film was considerably poor in the gas barrier property.

The meanings of the abbreviation used in the above Table 1 (FIG. 9) are as follows.

CPP: Polypropylene film (trade name: Pylene Film-CT, mfd. by Toyobo K.K.)

OPP: Biaxially oriented polypropylene film (trade name: Pylene Film-OT, mfd. by Toyobo K.K.)

OPET: Biaxially oriented polyethylene terephthalate film (trade name: Lumilar, mfd. by Toray K.K.)

NA: Tetrasilylic mica fine powder (trade name: NaTS, mfd. by Topee Kogyo Co.); particle size=977 nm, unit thickness a=0.9557 nm, aspect ratio Z=1043.

F: Natural montmorillonite (trade name: Kunipia F, mfd. by Kunimine Kogyo Co.); particle size=560 nm, unit thickness a=1.2156 nm, aspect ratio Z=461.

L: Synthetic hectorite (trade name: Laponite XLS, mfd. by Nihon Silica Kogyo Co.); particle size=35 nm, unit thickness a=about 1 nm (diffraction peak was broad), aspect ratio Z=about 35.

H: Polyvinyl alcohol (trade name: Poval 117H, mfd. by Kuraray K.K., degree of polymerization=1700, saponification degree=99.6 mol %, 117: Polyvinyl alcohol (trade name: Poval 117, mfd. by Kuraray K.K., degree of polymerization=1700, saponification degree=98.5 mol %)

Z: Aqueous solution of zirconium ammonium carbonate (trade name: Zircozol AC7, mfd. by Dai-ichi Kigenso Kogyo Co.)

19

A: Heat treatment at 180° C., for 5 min.

FIGS. 11–16 respectively show powder X-ray diffraction peaks of an inorganic laminar compound or composition each having various values of the lattice spacing d.

Figure 11:
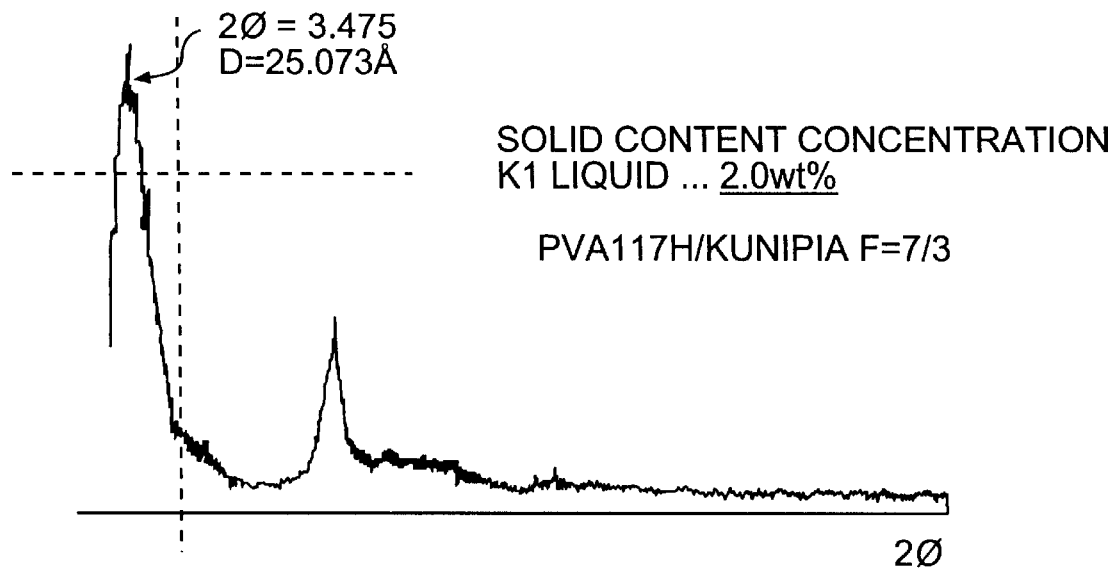
FIG. 11 is a graph showing X-ray diffraction peaks of a composition comprising a polyvinyl alcohol PVA-117H and "Kunipia F" used in Examples.
Figure 12:
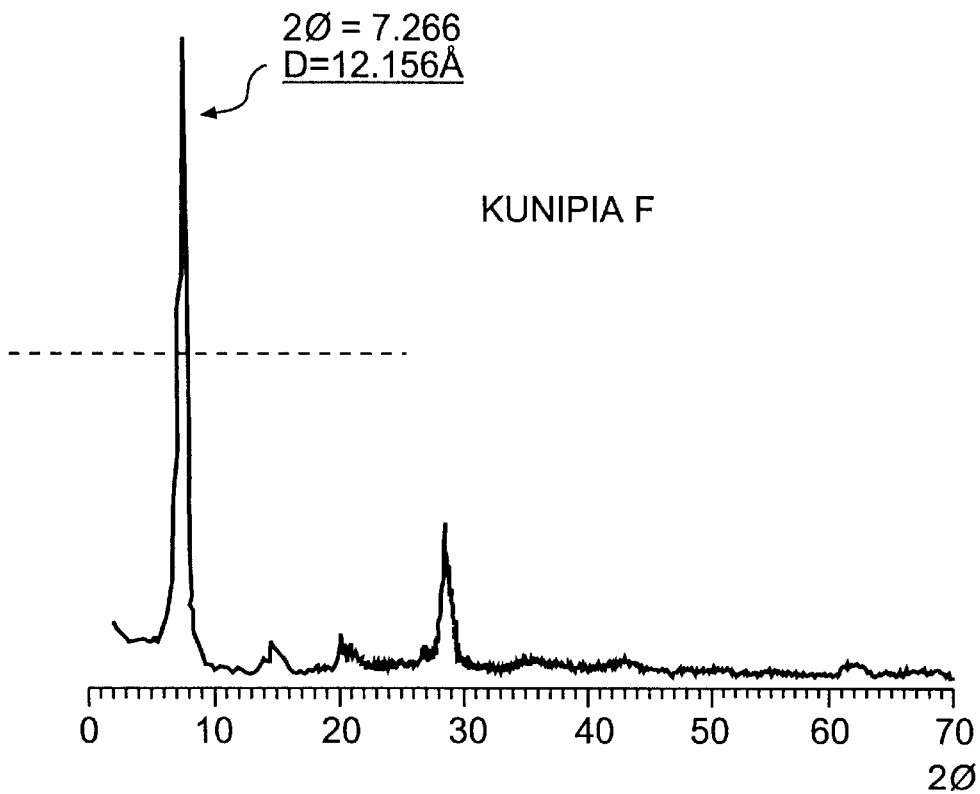
FIG. 12 is a graph showing X-ray diffraction peaks of "Kunipia F" (montmorillonite) used in Examples.

FIG. 11 is a graph showing X-ray diffraction peaks of a polyvinyl alcohol PVA-117H/"Kunipia F" composition used in the above Examples. FIG. 12 is a graph showing X-ray diffraction peaks of "Kunipia F" (montmorillonite) used in the above Examples.

Figure 13:
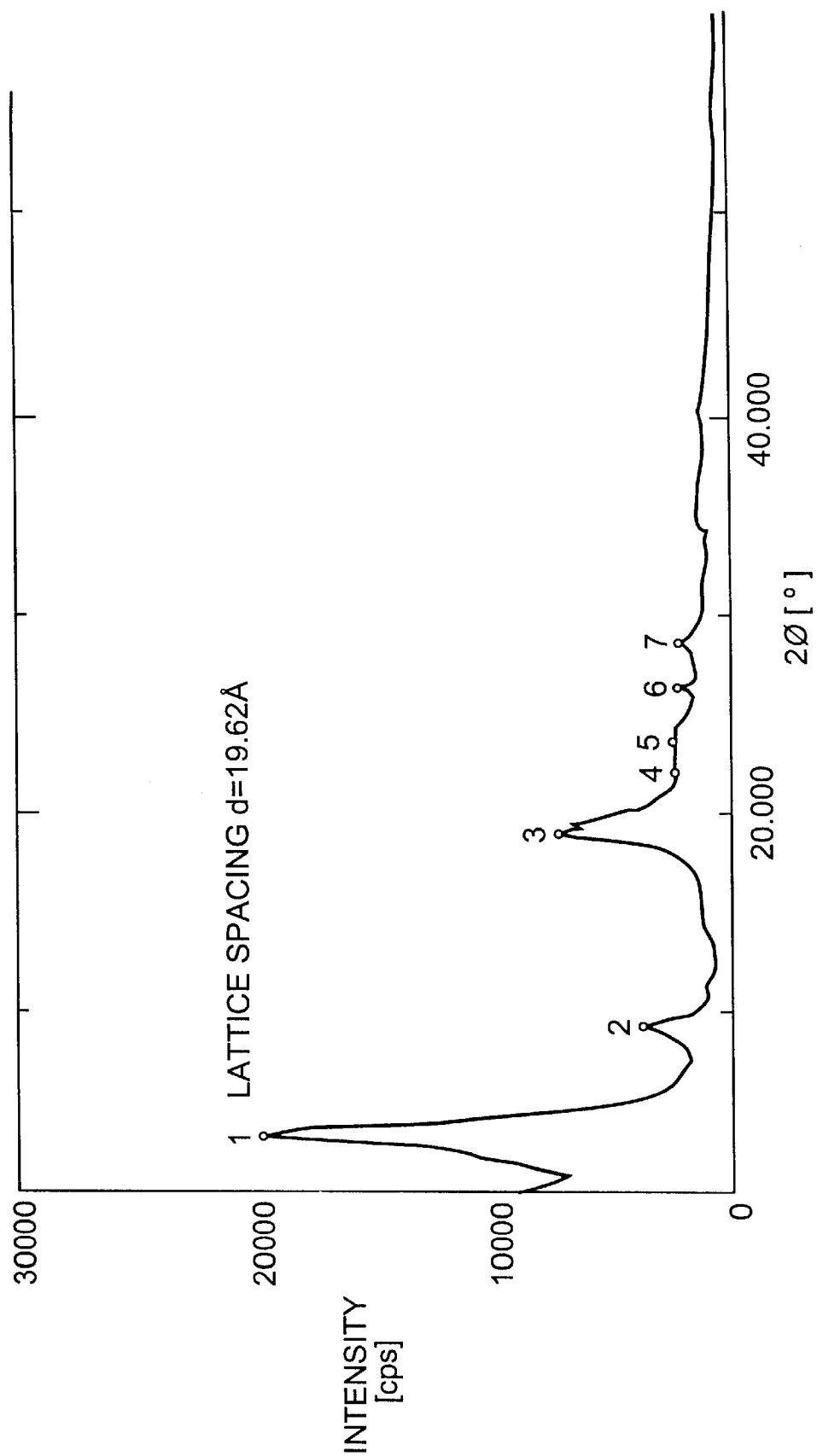
FIG. 13 is a graph showing X-ray diffraction peaks of a composition having a lattice spacing d=19.62 angstrom (pattern of the above FIG. 2).
Figure 14:
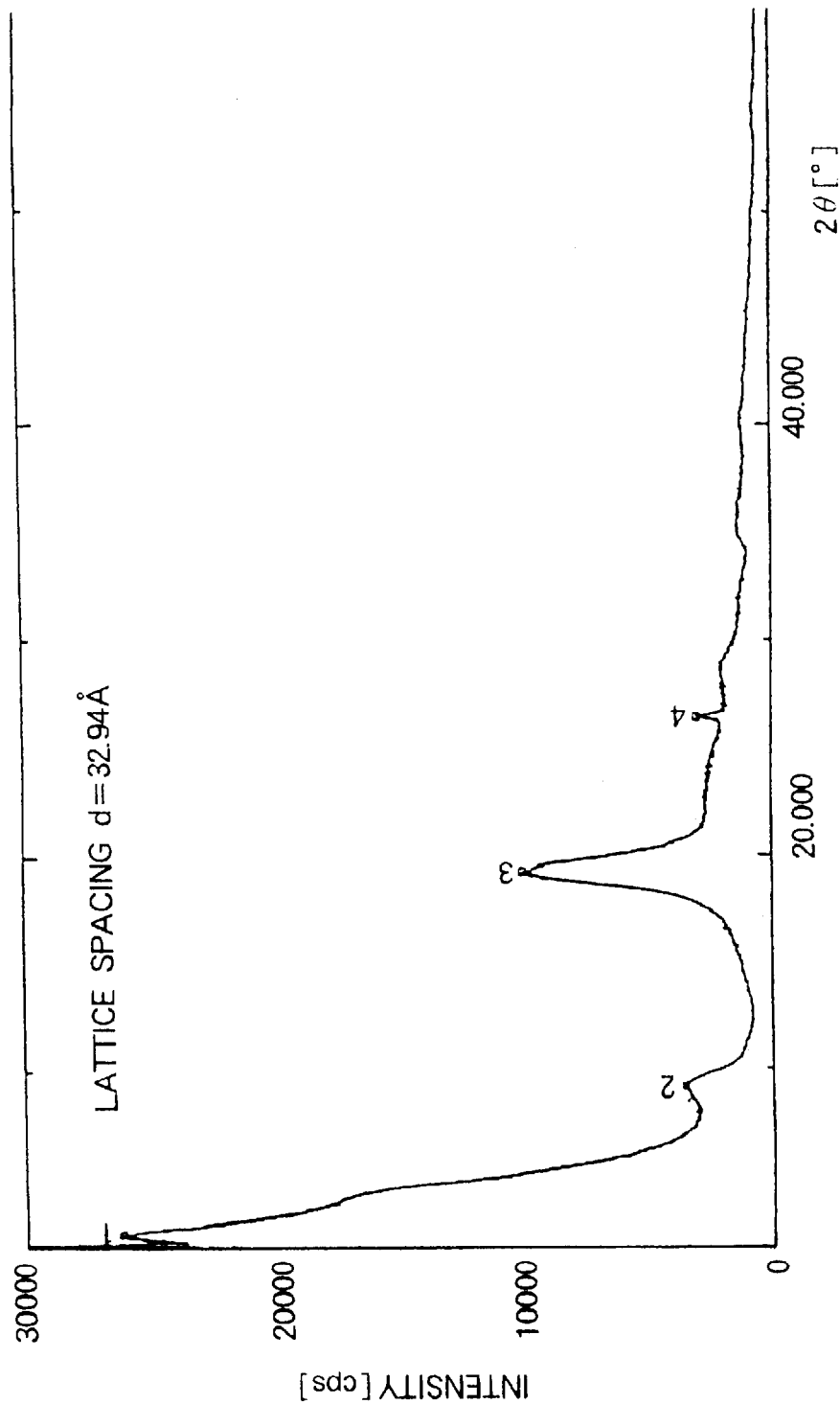
FIG. 14 is a graph showing X-ray diffraction peaks of a composition having a lattice spacing d=32.94 angstrom (pattern having the Above patterns of FIGS. 2 and 3).

FIG. 13 (composition having a lattice spacing d=19.62 Å (pattern of the above FIG. 2), FIG. 14 (composition having a lattice spacing d=32.94 Å, pattern of the above FIG. 2 or FIG. 3), FIG. 15 (composition having a lattice spacing d≧44.13 Å, pattern of the above FIG. 3), and FIG. 16 (composition having a lattice spacing d=≧44.13 Å, pattern of the above FIG. 3) are graphs respectively showing powder X-ray diffraction peaks of compositions having various values of the lattice spacing d.

INDUSTRIAL APPLICABILITY

As described hereinabove, according to the present invention, there are provided a resin composition comprising: polyvinyl alcohol, and an inorganic laminar compound having an aspect ratio of not less than 50 and not more than 5000, wherein the volume ratio of (inorganic laminar compound/polyvinyl alcohol) is in the range of (5/95) to (30/70); a laminate comprising such a resin composition as at least a layer thereof; and a laminate film comprising a base material and at least one layer disposed thereon and comprising the above resin composition.

According to the present invention, a gas barrier property at a high level which has never been achieved in the prior art, may be imparted to the resin composition, while retaining both of a good folding resistance and a good film strength.

As described in the above "Best Mode for Carrying Out the invention" and "Examples", although an inorganic laminar compound having a small aspect ratio imparts only a low gas barrier property to a polyvinyl alcohol, an inorganic laminar compound having an aspect ratio of not less than 50 and not more than 5000 used in the present invention exhibit a sufficient effect of imparting a gas barrier property to a polyvinyl alcohol. In addition, in the above volume ratio (inorganic laminar compound/polyvinyl alcohol) range of (5/95) to (30/70) used in the present invention, i.e., in a relatively small volume fraction range of the inorganic laminar compound, a pin hole which is capable of considerably decreasing the gas barrier property at the time of folding is less liable to be produced. As a result, in such a range, the dropping-out of a film comprising the above resin composition is effectively suppressed, and further the peeling strength at the time of laminating an inorganic laminar compound-containing layer onto another base material may be considerably improved.

On the basis of the above-mentioned characteristics, the resin composition, or laminate film according to the present invention is usable as a packaging material. In the usage in food packaging, it is usable for a wide range of packaging, such as: "miso" (soybean paste), pickles, daily dish, baby food, "tsukudani" (preserved food boiled down in soy sauce), "konnyaku" (paste made from devil's-tongue),

20

"chikuwa" (Japanese fish paste cooked in a bamboo-like shape), "kamaboko" (boiled fish paste), processed marine products, meat ball, hamburger steak, Genghis Khan-type meat (meat for cooking), ham, sausage, and other processed stock raising products, green tea, coffee, tea, dried bonito, "tororo-konbu" (sliced tangle), oily confectionery such as French fried potatoes and buttered peanuts, confectionery made from rice, biscuit, cookie, cake, "manjuu" (bun stuffed with sweetened bean paste), sponge cake, cheese, butter, cut rice cake, soup, source, Chinese noodles, etc.

In addition, the resin composition or laminate film according to the present invention is suitably usable for a wide range purposes including industrial packaging such as: those in the fields of medical, electronics, chemical and mechanical; more specifically, packaging of feed for pets, agricultural chemicals and fertilizer, and package for transfusion; and semiconductor packaging, packaging of an oxidative agent (or an agent susceptible to oxidation), precision material packaging, etc.

Further, the laminate, laminate film or shaped article according to the present invention is suitably usable as a shaped article in the form of bottle, tray, etc., to be used for a squeezing-type bottle of mayonnaise, juice, soy sauce, edible oil, sauce, food tray for microwave oven, cups for yogurt, etc.

The resin composition according to the present invention may exhibit a good gas barrier property in any form or shape of those as described hereinabove, while retaining a good folding resistance and a good film strength.

What is claimed is:

1. A laminate film comprising:
   at least one base layer;
   at least one inorganic laminar compound-containing layer on said at least one base layer, wherein said inorganic compound containing layer comprises, as a mixture:
   (a) a polyvinyl alcohol having a saponification degree of not of not less than 70% based on mole percent, and
   (b) an inorganic laminar compound having an aspect ratio of 200 to 3000, which has a volume ratio of inorganic laminar compound/polyvinyl alcohol in the range of 5/95 to 30/70, wherein said inorganic laminar compound is an inorganic compound having a layered crystal structure wherein unit crystal layers are mutually stacked to form said layered structure, and said inorganic laminar compound is swollen or cleft when in a solvent; and
   a non-oriented polypropylene film laminated onto said at least one inorganic laminar compound-containing layer.

2. A laminate film comprising:
   at least one base layer;
   an inorganic laminar compound-containing layer on said at least one base layer, wherein said inorganic laminar compound-containing layer comprises, as a mixture,
   (a) a polyvinyl alcohol having a saponification degree of not less than 70% based on mole percent, and
   (b) an inorganic laminar compound having an aspect ratio of 200 to 3000, which has a volume ratio of inorganic laminar compound/polyvinyl alcohol in the range of 5/95 to 30/70, wherein said inorganic laminar compound is an inorganic compound having a layered crystal structure wherein unit crystal layers are mutually stacked to form said layered structure, is swollen or cleft when in a solvent, and exhibits an oxygen permeability of not more than 0.5 $cc/m^2 \cdot day \cdot atm$ under the condition of 30° C. and 60% relative humidity; and a non-oriented polypropylene film laminated onto said at least one inorganic laminar compound-containing layer.

3. The laminate film according to claim 1 or 2, wherein said non-oriented polypropylene film is dry-laminated onto the inorganic laminar compound-containing layer of said laminate film.

4. The laminate film according to claim 1 or 2, wherein said inorganic laminar compound-containing layer is formed by applying a coating liquid containing the mixture onto a surface of said base layer and then drying the resultant coating.

5. The laminate film according to claim 2, wherein said inorganic laminar compound-containing layer of said laminate film is formed and then laminated onto the base material.

6. The laminate film according to claim 2, wherein said base material is extrusion-laminated onto the inorganic laminar compound-containing layer of said laminate film.

7. The laminate film according to claim 1 or 2, wherein said polyvinyl alcohol has a degree of saponification of not less than 85% based on mole percent.

8. The laminate film according to claim 7, wherein the degree of saponification is not less than 98%.

9. The laminate film according to claim 1 or 2, wherein the polyvinyl alcohol has a degree of polymerization of 200 to 3000.

10. The laminate film according to claim 1 or 2, wherein the aspect ratio is not more than 2000.

11. The laminate film according to claim 1 or 2, wherein the volume ratio of inorganic laminar compound/polyvinyl alcohol is 7/93 to 17/83.

\* \* \* \* \*